United States Patent
Hong et al.

(10) Patent No.: US 8,705,626 B2
(45) Date of Patent: Apr. 22, 2014

(54) MOTION ESTIMATION METHOD

(75) Inventors: Wei-Hsiang Hong, Hsinchu Hsien (TW); Chia Chiang Ho, Hsinchu Hsien (TW)

(73) Assignee: MStar Semiconductor, Inc. (TW)

(*) Notice: Subject to any disclaimer, the term of this patent is extended or adjusted under 35 U.S.C. 154(b) by 1064 days.

(21) Appl. No.: 12/730,814

(22) Filed: Mar. 24, 2010

(65) Prior Publication Data

US 2010/0253854 A1  Oct. 7, 2010

(30) Foreign Application Priority Data

Apr. 2, 2009  (TW) ............................. 98111032 A

(51) Int. Cl.
| H04N 7/12 | (2006.01) |
| H04N 11/02 | (2006.01) |
| H04N 11/04 | (2006.01) |
| H04B 1/66 | (2006.01) |
| H04N 5/14 | (2006.01) |

(52) U.S. Cl.
CPC ..................................... *H04N 5/145* (2013.01)
USPC .................................................... 375/240.16

(58) Field of Classification Search
None
See application file for complete search history.

(56) References Cited

U.S. PATENT DOCUMENTS

| 6,330,282 B1 * | 12/2001 | Miyazaki | 375/240.16 |
| 7,079,579 B2 * | 7/2006 | Han et al. | 375/240.16 |
| 7,512,180 B2 * | 3/2009 | Florencio | 375/240.12 |
| 8,259,809 B2 * | 9/2012 | Lin | 375/240.17 |
| 2002/0039386 A1 * | 4/2002 | Han et al. | 375/240.16 |

* cited by examiner

*Primary Examiner* — Nhon Diep
(74) *Attorney, Agent, or Firm* — Han IP Corporation

(57) ABSTRACT

A motion estimation method applied to a video signal having a first frame and a second frame is provided. The motion estimation method includes: capturing a matching window from the first frame; capturing a searching area from the second frame, the searching area including a plurality of searching blocks each having a size equal to that of the matching window; selecting one of the searching blocks; calculating a difference between pixel data of the selected searching blocks and pixel data of the matching window, so as to obtain N total differences corresponding to N searching blocks; and determining a motion vector corresponding to the matching window according to the N total differences.

6 Claims, 8 Drawing Sheets

MOTION ESTIMATION METHOD

CROSS REFERENCE TO RELATED PATENT APPLICATIONS

This patent application claims priority from Taiwan Patent Application No. 098111032, filed in the Taiwan Patent Office on Apr. 2, 2009, entitled "Motion Estimation Method", and incorporates the Taiwan patent application in its entirety by reference.

TECHNICAL FIELD

The present disclosure relates to a motion estimation method, and more particularly, to a motion estimation method capable of accelerating calculation speed and reducing hardware cost.

BACKGROUND

Motion estimation, a technology widely used in image processing, determines a motion vector of an image corresponding to a similar image or an identical image within its adjacent frames. Most novel video encoding circuits, e.g., systems compatible to the H.26x or MPEG protocols, implement motion estimation to search for similarities between images from different video images, so as to achieve application functions, e.g., image compression.

Motion estimation is for finding a most appropriate motion vector, which represents a relative displacement of the same image block (i.e., a matching window) between two different frames. FIG. 1 shows a schematic diagram of a motion vector V in the prior art. The motion vector V represents a horizontal and vertical displacement vector (e.g., the motion vector V illustrated in FIG. 1) corresponding to an image block between a previous frame and a current frame.

The conventional image processing technology mainly uses block matching to find a motion vector. FIG. 2 shows a schematic diagram of motion estimation in the prior art, for matching a first frame 10 and a second frame 12, as shown. A predetermined matching window 100 having a size of, e.g., 16*16, 16*8, 8*16, 8*8, 8*4, 4*8 or 4*4 pixels, may be captured in the first frame 10. In FIG. 2, a matching window 100 having a size of 4*4 pixels is taken as an example.

A searching area 120 having a plurality of searching blocks, e.g., a searching block 1200a and 1200b illustrated in FIG. 2, is captured in the second frame 12. Each of the searching blocks has a size equal to that of the matching window 100. For example, referring to FIG. 2, the searching area 120 has a size of 8*10 pixels, and each of the searching blocks has a size of 4*4 pixels.

In the conventional motion estimation method, each of the searching blocks in the searching area is compared with the matching window 100 to obtain a difference corresponding to each of the searching blocks, and a smallest difference is found to locate a most similar searching block. Accordingly, a motion vector corresponding to the matching window 100 is determined based on the most similar searching block.

In a conventional full search algorithm, a matching window of a first image is compared with all possible searching blocks in a searching area of a second image one after another. Such full search algorithm has advantages of involving purely data processing programs and providing accurate matching results.

However, the conventional motion estimation method with the full search algorithm needs large amount of calculation resources, e.g., large amount of buffers for storing matching windows and image information of searching blocks during a matching process. In addition, comparing each possible searching block with the matching window one after another is rather complex and time-consuming. More particularly, time needed for calculation accordingly increases as the searching area becomes larger.

In another aspect, some conventional motion estimation methods do not use the full search algorithm that calculates a total difference on all searching blocks within a searching area. Instead, the total difference is calculated in a hopping manner, or the searching blocks are partially compared to obtain a total difference corresponding to the partially compared searching blocks. Consequently, although a motion estimation flow is accelerated, accuracy of a motion vector is deteriorated in reciprocation.

In order to solve the foregoing problem, a motion estimation method is provided to accelerate a motion estimation flow and save resources needed for calculation while maintaining the advantageous characteristics of the full search method without sacrificing the search accuracy.

SUMMARY

One object of the present disclosure is to provide a motion estimation method used for performing calculation processing on a video signal comprising a first frame and a second frame.

According to an embodiment, the motion estimation method comprises capturing a matching window from the first frame; capturing a searching area from the second frame, the searching area comprising a plurality of searching blocks each having a size equal to that of the matching window; selecting one searching block from the plurality of searching blocks and calculating a difference between pixel data within the selected searching block and pixel data within the matching window, so as to simultaneously obtain N total differences corresponding to N searching blocks from calculating a difference between one single searching block and the matching window is calculated, where N is greater than 1; and determining a motion vector of the matching vector according to the N total differences.

In this embodiment, the searching area comprises M*N searching blocks, and the difference is calculated on a single searching block. In addition, in the motion estimation method according to the present disclosure, the step of selecting one searching block from the plurality of searching blocks and calculating the difference between the pixel data within the selected searching block and the pixel data within the matching window may be repeated M times to calculate differences corresponding to M searching blocks in the searching area, so as to obtain M*N total differences corresponding to the M*N searching blocks. All total differences are then compared to find a searching block having a smallest difference corresponding to the matching window. Accordingly, a motion vector of the same matching window between the first frame and the second frame is determined.

Compared to the prior art, in the motion estimation method according to the present disclosure, when one matching window is compared to one searching block once, N total differences respectively corresponding to N different searching blocks are simultaneously obtained. Therefore, in the motion estimation method according to the present disclosure, a full search can still be performed on all possible searching blocks within a range of a searching area while a calculation process for motion estimation is accelerated by theoretical N times, and memory resources occupied during the calculation process is reduced.

The advantages and spirit related to the present disclosure can be further understood via the following detailed description and drawings.

DETAILED DESCRIPTION OF THE PREFERRED EMBODIMENT

Figure 1:
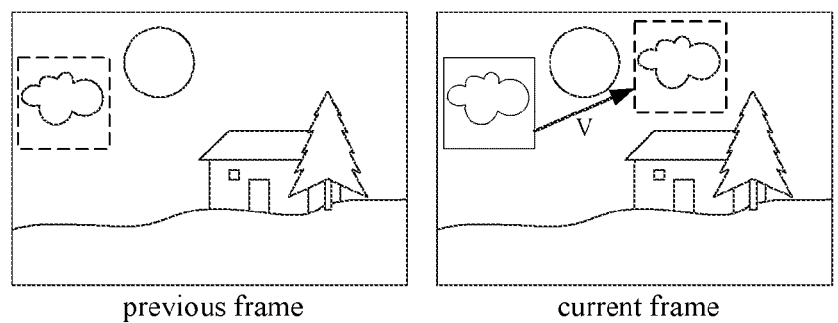
FIG. 1 is a schematic diagram of a motion vector in the prior art.
Figure 2:
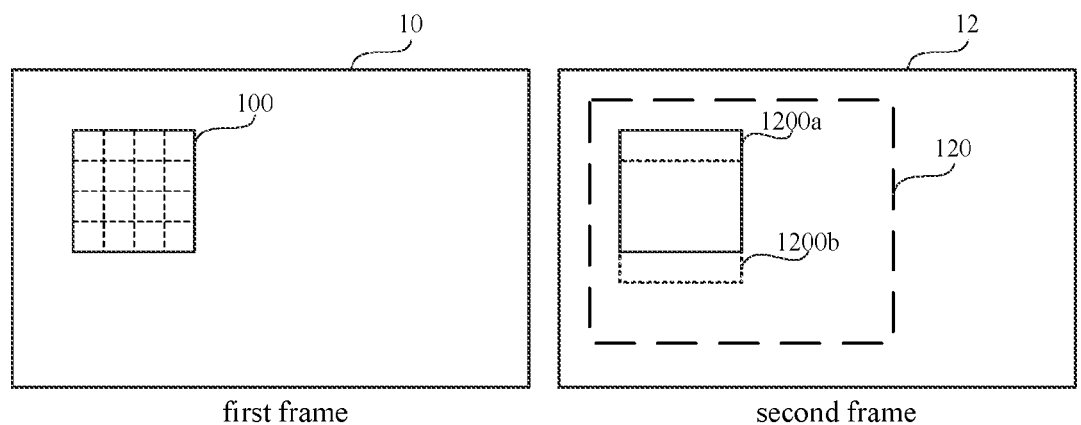
FIG. 2 is a schematic diagram of a motion estimation method in the prior art.
Figure 3:
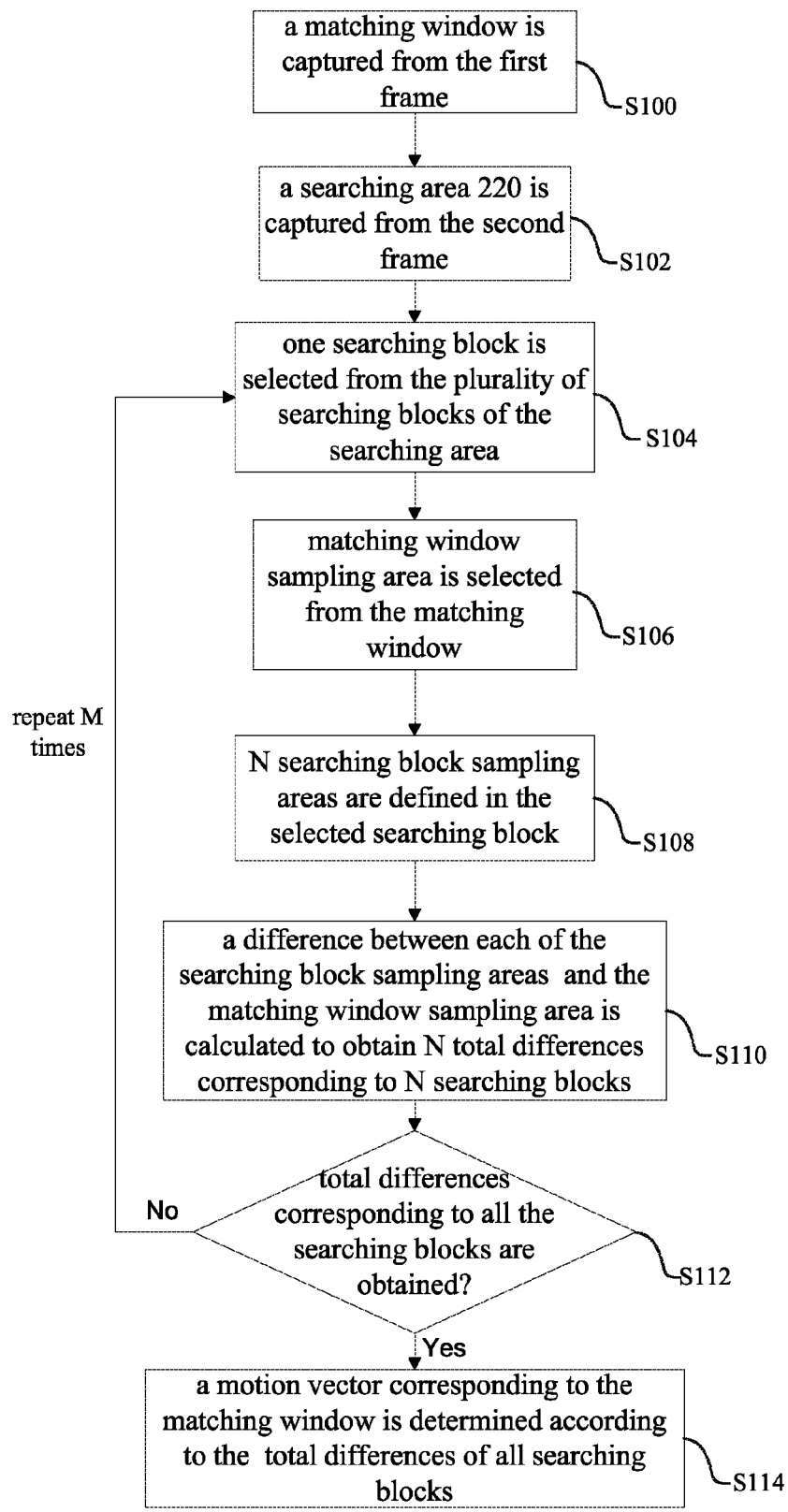
FIG. 3 is a flow chart of a motion estimation method in accordance with a first embodiment of the present disclosure.

FIG. 3 is a flow chart of a motion estimation method in accordance with a first embodiment of the present disclosure. In this embodiment, the motion estimation method is used for performing image analysis on a video signal comprising a first frame and a second frame. In a practical application, the first frame and the second frame may be two groups of frames at different time points, from different image sources, or substantially similar or different. The motion estimation method according to the present disclosure is for determining from two groups of frames a motion vector corresponding to a certain image block (i.e., a matching window) to obtain a relative motion relationship of the image block between the two different frames.

Figure 4A:
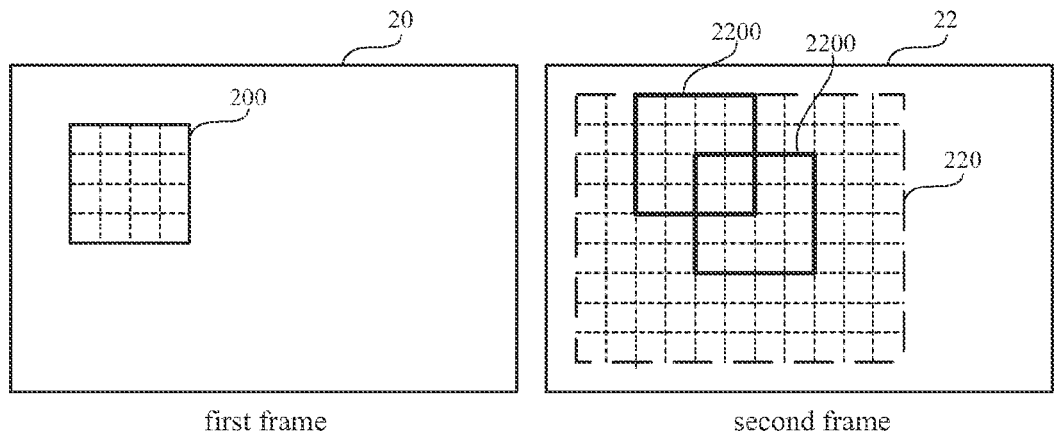
FIG. 4A to FIG. 4E are schematic diagrams of a first frame and a second frame in accordance with the first embodiment of the present disclosure.
Figure 4B:
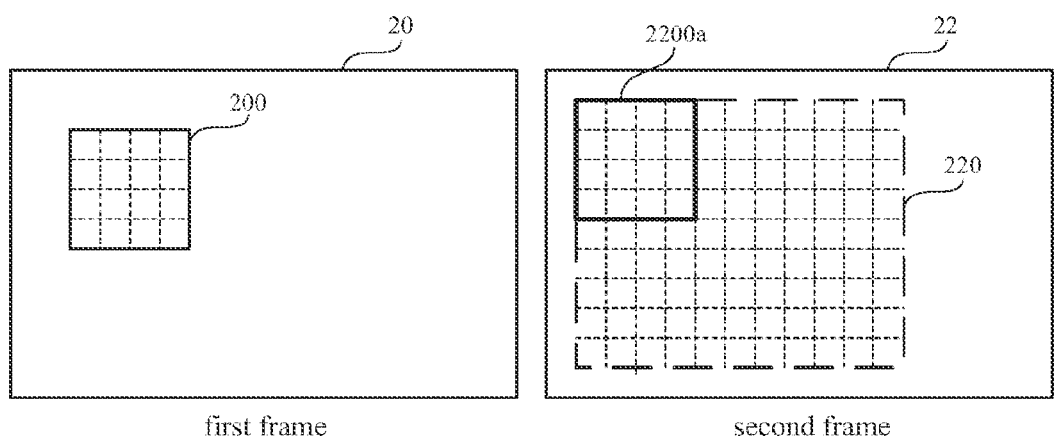

Refer to FIG. 4A to FIG. 4E showing schematic diagrams of a first frame 20 and a second frame 22 in accordance with a first embodiment of the present disclosure. Referring to FIG. 4A, a motion estimation method according to the present disclosure begins with Step S100. In Step S100, a matching window 200 is captured from the first frame 20. In Step S102, a searching area 220 is captured from the second frame 22. In this embodiment, the searching area 220 comprises a plurality of searching blocks 2200 each having a size equal to that of the matching window 200.

In this embodiment, for illustration purposes, suppose that the matching window 200 illustrated in FIG. 4 comprises 4*4 pixel data, each of the searching blocks 2200 comprises 4*4 pixel data, and the searching area 220 comprises 9*11 pixel data and 6*8=48 different searching blocks 2200; however, the present disclosure is not limited to the foregoing examples.

In Step S104, one searching block is selected from the plurality of searching blocks of the searching area 220, and the selected searching block is a searching block 2200a (illustrated in FIG. 4B), for example.

Figure 4C:
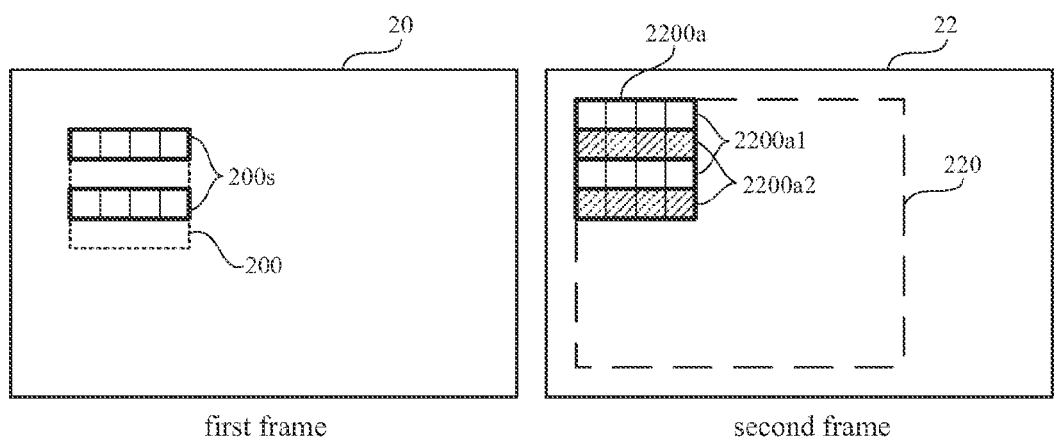

In Step S106, a matching window sampling area 200s is selected from the matching window 200 (illustrated in FIG. 4C). In Step S108, two searching block sampling areas (e.g. searching block sampling areas 2200a1 and 2200a2 illustrated in FIG. 4C) are defined in the selected searching block 2200a, and each of the searching block sampling areas has a size equal to that of the matching window sampling area 200s.

In Step S110, a difference between each of the searching block sampling areas 2200a1 and 2200a2 and the matching window sampling area 200s is calculated to obtain two total differences corresponding to the searching block sampling areas 2200a1 and 2200a2.

The difference calculated in Step S110 is a sum of absolute differences (SAD) or a sum of absolute transformed differences (SATD). In this embodiment, supposing that the difference between the matching window sampling area 200s and the searching block sampling area 2200a1 is the SAD, the motion estimation method further comprises:

1) storing a plurality of pixel data of the matching window sampling area 200s and a plurality of pixel data of the searching block sampling area 2200a1 into different buffers;

2) corresponding to the search area 2200a1, obtaining a plurality of differences as absolute values calculated by respectively subtracting the plurality of pixel data of the searching block sampling area 2200a1 from the plurality of pixel data of the matching window sampling area 200s; and 3) obtaining a total difference corresponding to the searching block sampling area 2200a1 by adding all the differences.

As for the other searching block sampling area 2200a2 of the searching block 2200a, a total difference corresponding to the searching block sampling area 2200a2 may also be obtained via a same flow of calculating the SAD.

In each difference calculation of the foregoing flow, only a half of the pixels of the matching window 200 are respectively compared to each of the searching block sampling areas, and thus not all of the pixel data need to be stored into buffers. Accordingly, in contrast to the prior art, only a half of the number of buffers for storing the pixel data of the matching window sampling area 200s is needed according to the disclosure.

Figure 4D:
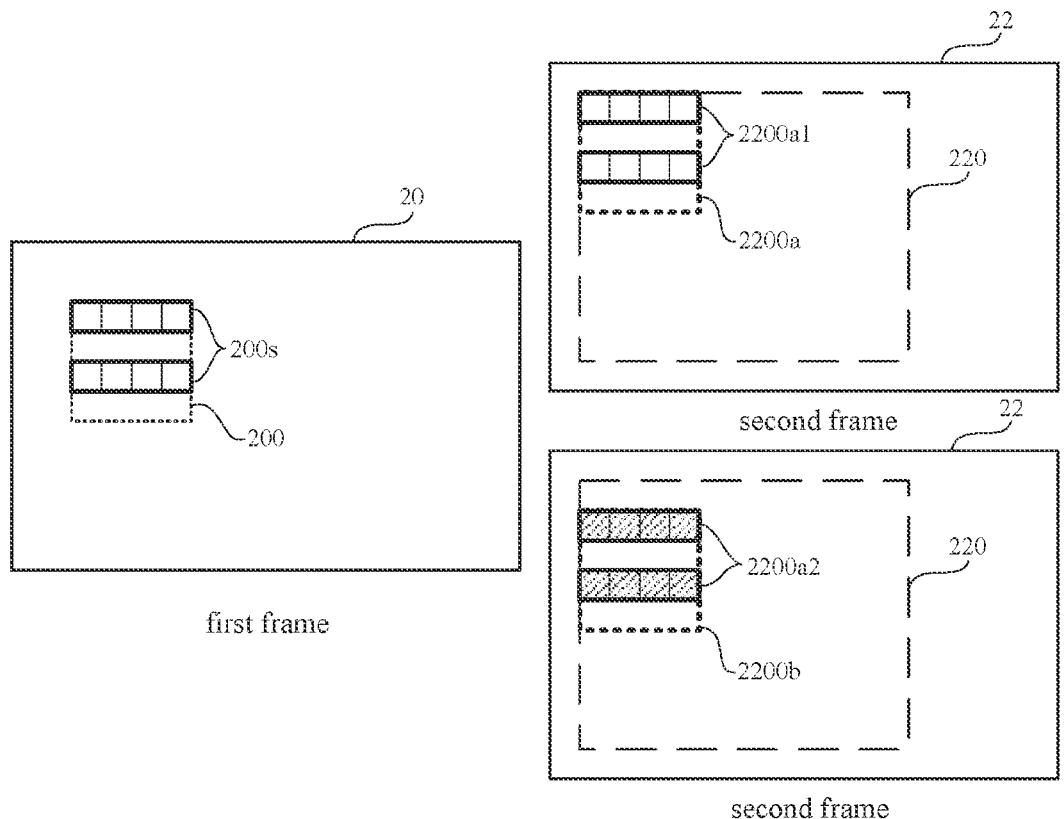
Figure 4E:
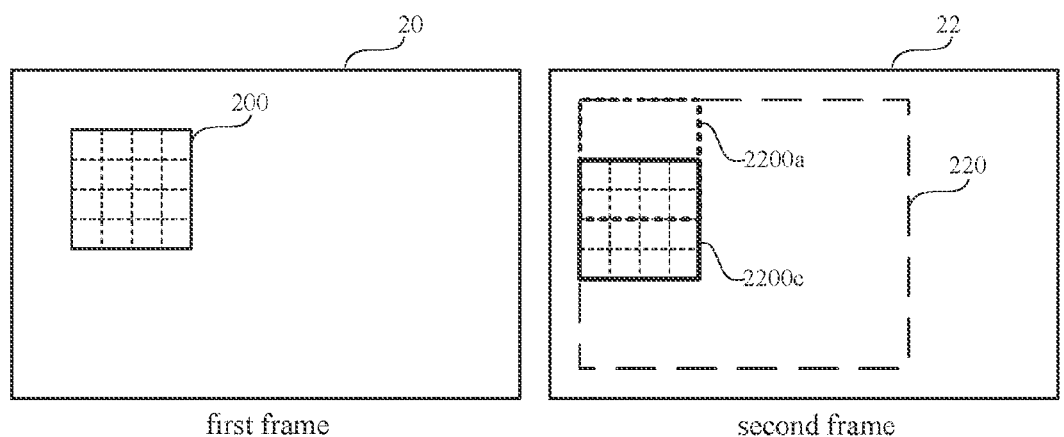

Refer to FIG. 4D. After the foregoing flow of calculating differences on one searching block 2200a, the total difference corresponding to the searching block sampling area 2200a1 and another total difference corresponding to the searching block sampling area 2200a2 are obtained. The total difference corresponding to the searching block sampling area 2200a1 is regarded as a total difference of the searching block 2200a; the total difference corresponding to the searching block sampling area 2200a2 is regarded as a total difference corresponding to another searching block 2200b, as illustrated in FIG. 4D. That is, the total differences corresponding to the searching blocks 2200a and 2200b are obtained via the flow of calculating differences on the searching block 2200a.

In Step S112, it is determined whether total differences corresponding to all the searching blocks 2200 within the searching area 220 are obtained. In this embodiment, two total differences corresponding to two searching blocks 2200a and 2200b are obtained, and thus the flow returns to Step S104 to select a next searching block, e.g., a searching block 2200c illustrated in FIG. 4E. Step S104 to Step S110 are iterated until total differences corresponding to all searching blocks are obtained. In this embodiment, the searching area 220 comprises 6*8=48 searching blocks 2200 (illustrated in FIG. 4A), and two total differences corresponding to two searching blocks 2200 are generated when the flow from Step S104 to Step S110 is performed once. More specifically, in the motion estimation method according to the present disclosure, total differences corresponding to 48 (i.e., 24*2) different searching blocks are obtained for block matching by performing the flow (from Step S104 to Step S110) 24 times in contrast to 48 times of the prior art.

In Step S114, a motion vector corresponding to the matching window 200 is determined according to the foregoing 48 total differences. For example, in a practical application, 48 total differences are arranged in sequence to find a smallest total difference, so as to locate a searching block having a smallest difference from the matching window 200 in the first frame 20. Therefore, according to a relative position relationship between the most similar searching block and the matching window 200, a motion vector corresponding to the matching window 200 between the first frame 20 and the second frame 22 is determined.

It is to be noted that, in Step S106 in this embodiment, a half of the original pixel data of the matching window 200 serves as the matching window sampling area 200s; however, the present disclosure does not limit the matching window sampling area to a half of the original pixel data, nor limit an arranged position of the pixel data.

Figure 5:
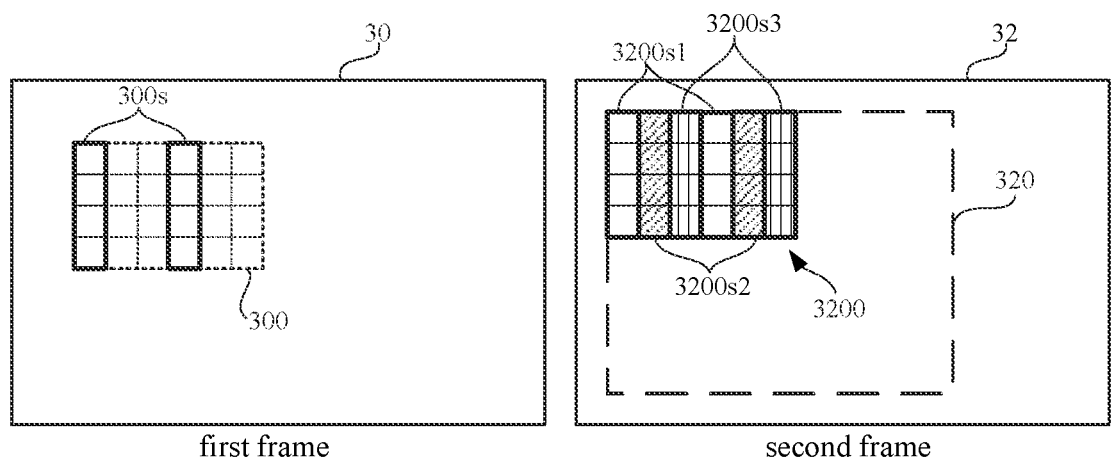
FIG. 5 is a schematic diagram of a first frame and a second frame in accordance with a second embodiment of the present disclosure.

Refer to FIG. 5 showing a schematic diagram of a first frame 30 and a second frame 32 in accordance with a second embodiment of the present disclosure. In this embodiment, the matching window 300 comprises 4*6 pixel data, and each of searching blocks 3200 comprises 4*6 pixel data. A main difference between the first embodiment and the second embodiment is that, in the step of selecting a matching window sampling area 300s from the matching window 300, one-third of pixels is selected in a vertical area to serve as the matching window sampling area 300s in the second embodiment, and three searching block sampling areas 3200s1, 3200s2 and 3200s3 are defined in one selected searching block 3200. More specifically, in the second embodiment, in the difference matching flow between one searching block 3200 and the matching window 300, total differences corresponding to three different searching blocks are obtained.

That is to say, when the searching area comprises M*N searching blocks, according to the motion estimation method of the present disclosure, total differences corresponding to N (N is an integer greater than 1, e.g., 2 in the first embodiment and 3 in the second embodiment) searching blocks are obtained from calculating differences between one searching block and the matching window once, and difference matching of M*N searching blocks is completed by performing the flow of difference matching on the selected searching block M times.

Therefore, in the motion estimation method according to the present disclosure, through adjusting the number of matching pixels of a searching block, total differences corresponding to N different searching blocks are obtained by performing difference matching once, and accordingly an effect of accelerating a motion estimation procedure by theoretical N times is achieved. Compared to the prior art, since the matching pixels are reduced, the number of buffers needed when calculating differences is further reduced to 1/N. In practical applications, the number of matching pixels and an acceleration effect of the motion estimation procedure are adjusted according to requirements on calculation accuracy, calculation speed and the number of buffers, as well as other user or design requirements.

Moreover, distribution of sampling areas, not limited to the straight area sampling approach mentioned in the foregoing embodiments, may be a massive, dot or slope distribution.

Figure 6:
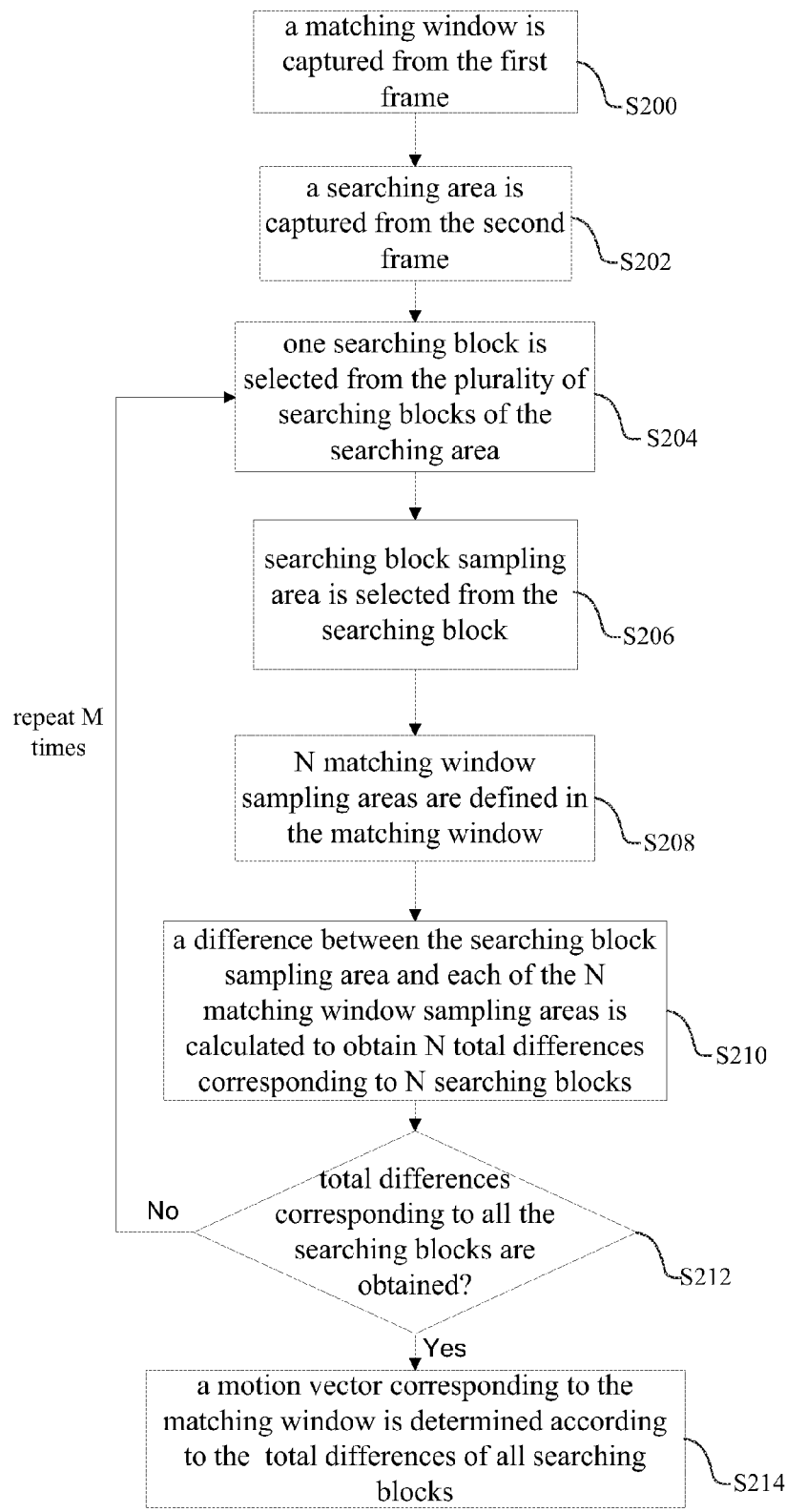
FIG. 6 is a flow chart of a motion estimation method in accordance with a third embodiment of the present disclosure.

Refer to FIG. 6 showing a flow chart of a motion estimation method in accordance with a third embodiment of the present disclosure. In this embodiment, the motion estimation method is applied to image analysis of a video signal comprising a first frame 40 and a second frame 42. The motion estimation method according to the present disclosure is for finding a relative motion relationship of a certain image block between two different frames.

Figure 7A:
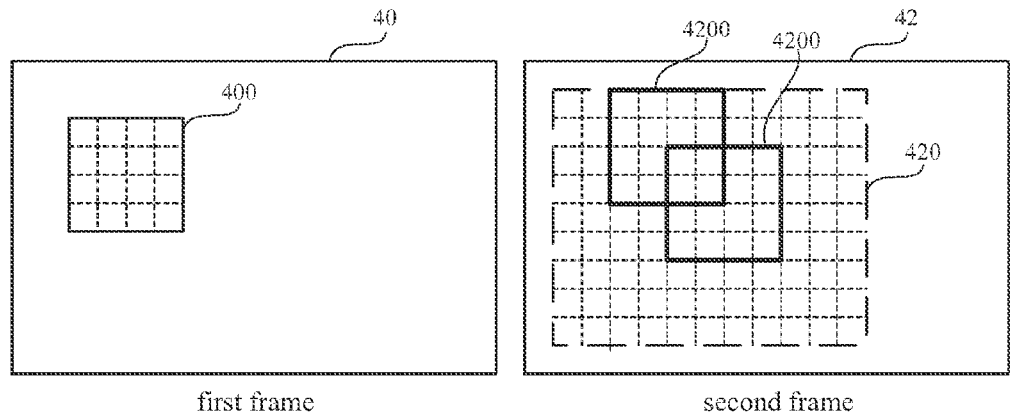
FIG. 7A to FIG. 7D are schematic diagrams of a first frame and a second frame in accordance with the third embodiment of the present disclosure.
Figure 7B:
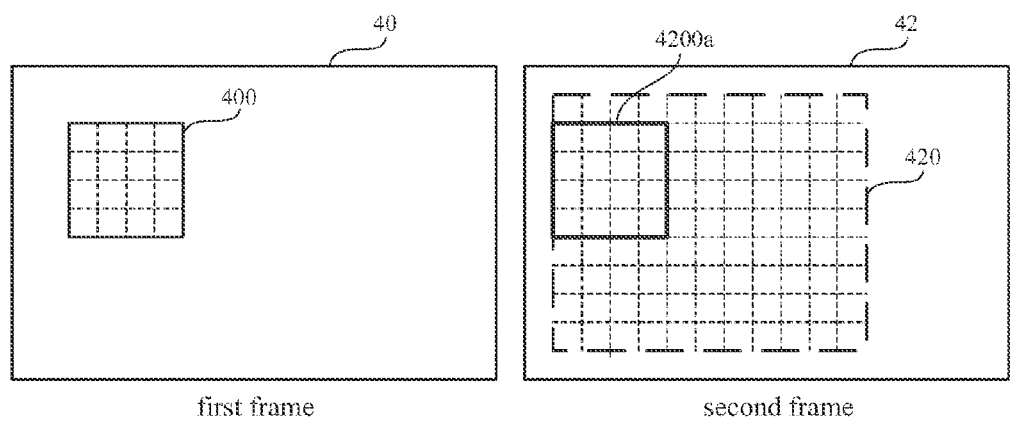
Figure 7C:
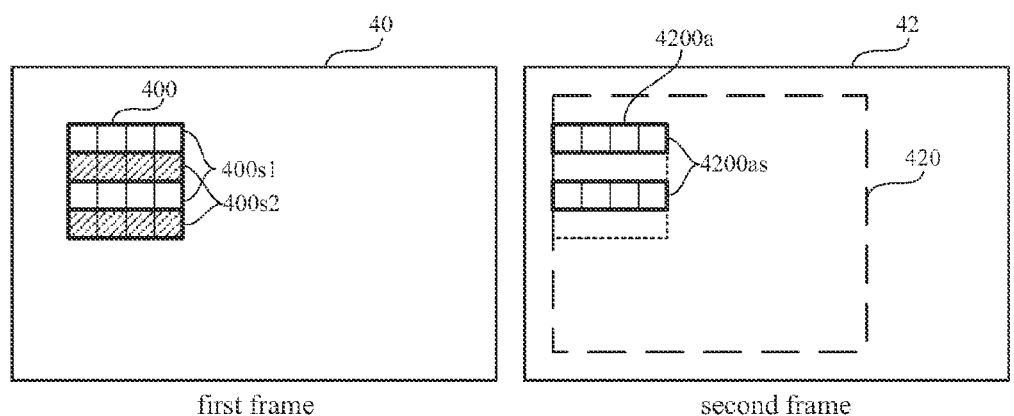

FIG. 7A to FIG. 7D show schematic diagrams of the first frame 40 and the second frame 42 in accordance with the third embodiment of the present disclosure. Referring to FIG. 7A, the motion estimation method according to the present disclosure begins with Step S200. In Step S200, a matching window 400 is captured from the first frame 40. In Step S202, a searching area 420 is captured from the second frame 42. In this embodiment, the searching area 420 comprises a plurality of searching blocks 4200 each having a size equal to that of the matching window 400. In Step S204, one searching block 4200a is selected from the plurality of searching blocks 4200 within the searching area 420.

A main difference between the third embodiment and the first embodiment is that, in the third embodiment, Step S206 is performed after Step S204. In Step S206, a searching block sampling area 4200as (illustrated in FIG. 7C) is selected from the searching block 4200a. In Step S208, two matching window sampling area 400s1 and 400s2 are defined in the matching window 400, and each of the matching window sampling areas has a size equal to that of the searching block sampling area 4200as.

That is, in the third embodiment, the searching block 4200a is first sampled, e.g., a half of the pixels of the searching block 4200a are selected for sampling. After that, two groups of corresponding sampling areas in the matching window 400 are generated for matching. Accordingly, pixel data of the searching block sampling area 4200as and pixel data of matching window sampling area 400s1 and 400s2 are stored into buffers to save buffers needed in calculation.

Figure 7D:
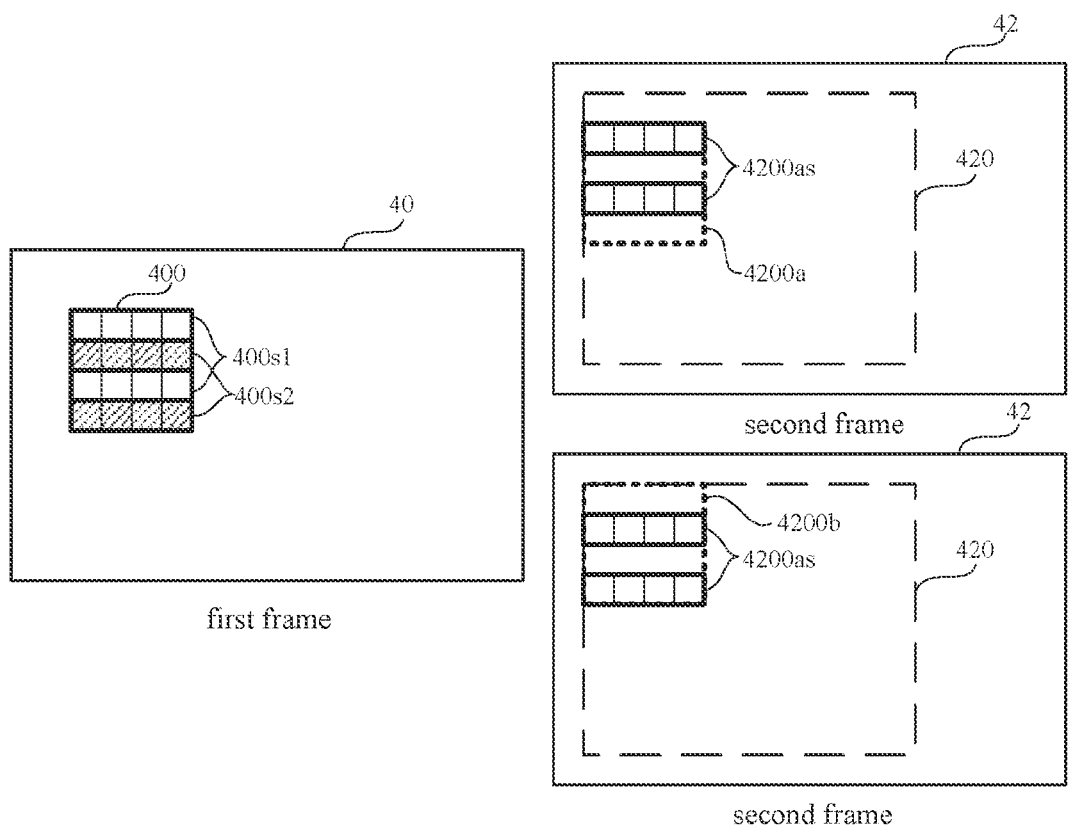

In Step S210, two total differences are obtained by respectively calculating a difference between the searching block sampling area 4200as and two matching window sampling area 400s1 and 400s2. Referring to FIG. 7D, the total difference corresponding to the matching window sampling area 400s1 is regarded as a total difference corresponding to the searching block 4200a, and the total difference corresponding to the matching window sampling area 400s2 is regarded as a total difference corresponding to the searching block 4200b. Accordingly, in Step S210, two total differences corresponding to the searching blocks 4200a and 4200b are respectively obtained. Other detailed steps and difference calculation methods of the third embodiment are similar to the foregoing description of abovementioned embodiments, and details thereof shall not be described for brevity.

In conclusion, in the motion estimation method according to the present disclosure, when one matching window is compared to one searching block once, N total differences respectively corresponding to N different searching blocks are simultaneously obtained. Therefore, in the motion estimation method according to the present disclosure, a full search can still be performed on all possible searching blocks within a range of a searching area while a calculation process for motion estimation is accelerated by N times, and memory resources consumed during the calculation process is reduced.

While the present disclosure has been described in terms of what is presently considered to be the most practical and preferred embodiments, it is to be understood that the inventive concept needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A motion estimation method, applied to a video signal comprising a first frame and a second frame, the method comprising:
   capturing a matching window from the first frame;
   capturing a searching area from the second frame, the searching area comprising a plurality of searching blocks each having a size equal to that of the matching window;
   selecting a searching block from the plurality of searching blocks;
   calculating a difference between pixel data of the selected searching block and pixel data of the matching window to simultaneously obtain N total differences corresponding to N different searching blocks, N being an integer greater than 1; and
   determining a motion vector corresponding to the matching window according to at least the N total differences,
   wherein the steps of selecting a searching block from the plurality of searching blocks and calculating the difference between pixel data of the selected searching block and the pixel data of the matching window comprises:
   selecting a matching window sampling area from the matching window;
   defining N searching block sampling areas within the selected searching block, each of the N searching block sampling areas having a size equal to that of the matching window sampling area; and
   respectively calculating a difference between each of the searching block sampling areas and the matching window sampling area to obtain the N total differences corresponding to the N searching blocks.

2. The motion estimation method as claimed in claim 1, further comprising:
   repeating the steps of selecting a searching block from the plurality of searching blocks and calculating the difference between the pixel data of the selected searching block and the pixel data of the matching window to complete calculating differences of M searching blocks of the plurality of search blocks, so that total differences corresponding to all searching blocks are obtained, M being an integer greater than 1; and
   the step of determining a motion vector corresponding to the matching window according to at least the N total differences further comprising:
   determining the motion vector corresponding to the matching window according to the total differences of all searching blocks;
   wherein, the number of searching blocks in the searching area is M*N.

3. The motion estimation method as claimed in claim 1, wherein the matching window sampling area and the selected searching block respectively comprise a plurality of pixel data, and the step of selecting a matching window sampling area from the matching window further comprises:
   respectively storing the plurality of pixel data of the matching window sampling area and the plurality of pixel data of the selected searching block into different buffers.

4. The motion estimation method as claimed in claim 1, wherein the matching window sampling area comprises a plurality of pixel data, wherein the plurality of searching block sampling area comprises a plurality of pixel data, and wherein the step of respectively calculating the difference between each of the searching block sampling areas and the matching window sampling area to obtain the N total differences corresponding to the N searching blocks comprises:
   calculating a difference between the pixel data of each of the searching block sampling areas and the pixel data of the matching window sampling area to obtain a plurality of differences; and
   obtaining a total difference corresponding to each of the searching blocks according to the plurality of differences.

5. The motion estimation method as claimed in claim 4, wherein the calculated difference between the plurality of searching block sampling areas and the matching window sampling area is a sum of absolute differences (SAD).

6. The motion estimation method as claimed in claim 4, wherein the difference between the plurality of searching block sampling areas and the matching window sampling area is a sum of absolute transformed differences (SATD).

* * * * *